(12) United States Patent
Chen et al.

(10) Patent No.: US 9,306,340 B2
(45) Date of Patent: Apr. 5, 2016

(54) SYSTEM AND METHOD FOR SUB-SEA CABLE TERMINATION

(71) Applicant: General Electric Company, Schenectady, NY (US)

(72) Inventors: Qin Chen, Schenectady, NY (US); Weijun Yin, Niskayuna, NY (US); Lili Zhang, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 185 days.

(21) Appl. No.: 14/105,205

(22) Filed: Dec. 13, 2013

(65) Prior Publication Data

US 2015/0171566 A1    Jun. 18, 2015

(51) Int. Cl.
*H01R 4/00* (2006.01)
*H01R 13/66* (2006.01)
*E21B 33/038* (2006.01)
*H01R 13/523* (2006.01)
*H01R 13/6592* (2011.01)
*H02G 15/103* (2006.01)
*H01R 13/6581* (2011.01)

(52) U.S. Cl.
CPC ........ *H01R 13/6616* (2013.01); *E21B 33/0385* (2013.01); *H01R 13/523* (2013.01); *H01R 13/6581* (2013.01); *H01R 13/6592* (2013.01); *H01R 13/665* (2013.01); *H02G 15/103* (2013.01)

(58) Field of Classification Search
CPC combination set(s) only.
See application file for complete search history.

(56) References Cited

U.S. PATENT DOCUMENTS

| | | | |
|---|---|---|---|
| 4,390,745 A * | 6/1983 | Bottcher et al. | 174/73.1 |
| 4,945,318 A | 7/1990 | Kabachinski et al. | |
| 5,488,199 A | 1/1996 | Selsing et al. | |
| 5,606,149 A * | 2/1997 | Yaworski et al. | 174/92 |
| 5,726,851 A | 3/1998 | Knapp | |
| 5,804,767 A * | 9/1998 | Winfield et al. | 174/74 R |
| 5,952,612 A * | 9/1999 | Winfield et al. | 174/74 R |
| 6,364,677 B1 | 4/2002 | Nysveen et al. | |
| 7,414,195 B2 * | 8/2008 | Janah et al. | 174/73.1 |

(Continued)

FOREIGN PATENT DOCUMENTS

| EP | 1870975 A1 * | 12/2007 | H02G 15/068 |
|---|---|---|---|
| EP | 2197080 A1 * | 6/2010 | H02G 15/184 |

(Continued)

OTHER PUBLICATIONS

European Search Report issued in connection with corresponding EP Application No. 14197616.7 on May 7, 2015.

(Continued)

*Primary Examiner* — William H Mayo, III
(74) *Attorney, Agent, or Firm* — Andrew J. Caruso

(57) ABSTRACT

An electrical connector includes a first cable termination chamber configured to receive a first power cable having at least a first conductor sheathed at least in part by a first insulating layer and a first insulation screen layer. Also, the electrical connector includes a first non-linear resistive layer configured to be coupled to a portion of the first conductor unsheathed by at least the first insulation screen layer and configured to control a direct current electric field generated in the first cable termination chamber. In addition, the electrical connector includes a first deflector configured to be coupled to the first power cable and control an alternating current electric field generated in the first cable termination chamber.

16 Claims, 5 Drawing Sheets

(56) References Cited

U.S. PATENT DOCUMENTS

| | | | |
|---|---|---|---|
| 7,476,114 B1 | 1/2009 | Contreras | |
| 2003/0188885 A1* | 10/2003 | Niinobe et al. | 174/73.1 |
| 2005/0264381 A1 | 12/2005 | Grothen et al. | |
| 2010/0279542 A1* | 11/2010 | Seraj et al. | 439/502 |

FOREIGN PATENT DOCUMENTS

| | | |
|---|---|---|
| GB | 1591596 A | 6/1981 |
| WO | 9611521 A1 | 4/1996 |
| WO | 2008076058 A1 | 6/2008 |
| WO | 2013004748 A2 | 1/2013 |

OTHER PUBLICATIONS

Rivenc et al., "An Overview of Electrical Properties for Stress Grading Optimization", Dielectrics and Electrical Insulation, IEEE Transactions on, pp. 309-318, vol. 6, Issue 3, Jun. 1999.

Gokcen., "Electric Field Analysis in Stress Controlled High Voltage Cables", Degree of Master of Science in Electrical and Electronics Engineering-Thesis, 84 Pages, Jan. 2005.

"6-36kV Medium Voltage Underground Power Cables", Nexans Energy Networks, 48 Pages, Mar. 2009.

Christen et al., "Nonlinear Resistive Electric Field Grading Part 1: Theory and Simulation", Electrical Insulation Magazine, IEEE, pp. 47-59, vol. 26, Issue 6, Dec. 3, 2010.

* cited by examiner

US 9,306,340 B2

SYSTEM AND METHOD FOR SUB-SEA CABLE TERMINATION

STATEMENT OF GOVERNMENT INTEREST

This invention was made with government support under DE-AC26-07NT42677 awarded by Department of Energy. The government has certain rights in the invention.

BACKGROUND

Embodiments of the present disclosure relate generally to high voltage cable termination, and more particularly to a system and method for underwater termination of high voltage power cables.

Typically, in an oil and gas well, power to electrical components on the sea floor is supplied from sea or land based power sources. In one example, the electrical components may include submerged process control equipment, pumping equipment, compression equipment, motors, and the like. These electrical components may be used to govern the extraction and injection of gas and liquids from the oil and gas well.

In general, high voltage power cables are used to supply power from the sea or land based power sources to these electrical components. Moreover, the high voltage power cables may be electrically connected to the electrical components using sub-sea connectors. Additionally, at large sea depths, multiple high voltage power cables may be required to supply power to these electrical components, thereby necessitating the interconnection of these high voltage power cables via the sub-sea connectors.

Since the sub-sea connectors are used for underwater electrical connections, these connectors may be subjected to harsh environments, such as varying sea water pressure and sea water ingression, which in turn may damage the connectors and/or electrical components. Also, retrieving the connectors for repair entails high expenditure.

In a conventional system, alternate current (AC) power cables and AC connectors are used to supply AC power to the electrical components on the sea floor. However, as oil exploration and drilling activities extend to deeper water depths, power transmission over long distances poses a bigger challenge for AC power cables because of the capacitive load of the cables. Thus, DC power transmission is a highly promising solution for sub-sea electrical components. In addition, the existing AC connectors cannot be used to connect DC power cables for DC power transmission because of special field distribution properties under DC which may lead to failure of the AC connectors.

BRIEF DESCRIPTION

In accordance with one embodiment described herein, an electrical connector is presented. The electrical connector includes a first cable termination chamber configured to receive a first power cable comprising at least a first conductor sheathed at least in part by a first insulating layer and a first insulation screen layer. Also, the electrical connector includes a first non-linear resistive layer configured to be coupled to a portion of the first conductor unsheathed by at least the first insulation screen layer and configured to control a direct current electric field generated in the first cable termination chamber. In addition, the electrical connector includes a first deflector configured to be coupled to the first power cable and control an alternating current electric field generated in the first cable termination chamber.

In accordance with a further aspect of the present disclosure, a method for controlling an electric field in an electrical connector is presented. The method includes receiving, by a first cable termination chamber, a first power cable including at least a first conductor sheathed at least in part by a first insulating layer and a first insulation screen layer. Also, the method includes controlling a direct current electric field generated in the first cable termination chamber by coupling a first non-linear resistive layer to a portion of the first conductor unsheathed by at least the first insulation screen layer. Further, the method includes controlling an alternating current electric field generated in the first cable termination chamber by coupling a first deflector to the first power cable.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As will be described in detail hereinafter, various embodiments of exemplary systems and methods for providing sub-sea electrical connections for DC power cables are presented. By employing the methods and the various embodiments of the system described hereinafter, direct current (DC) electric fields and/or alternate current (AC) electric fields generated at the termination of power cables may be substantially minimized, which in turn reduces stress induced in components that are used for the electrical connections.

Figure 1:
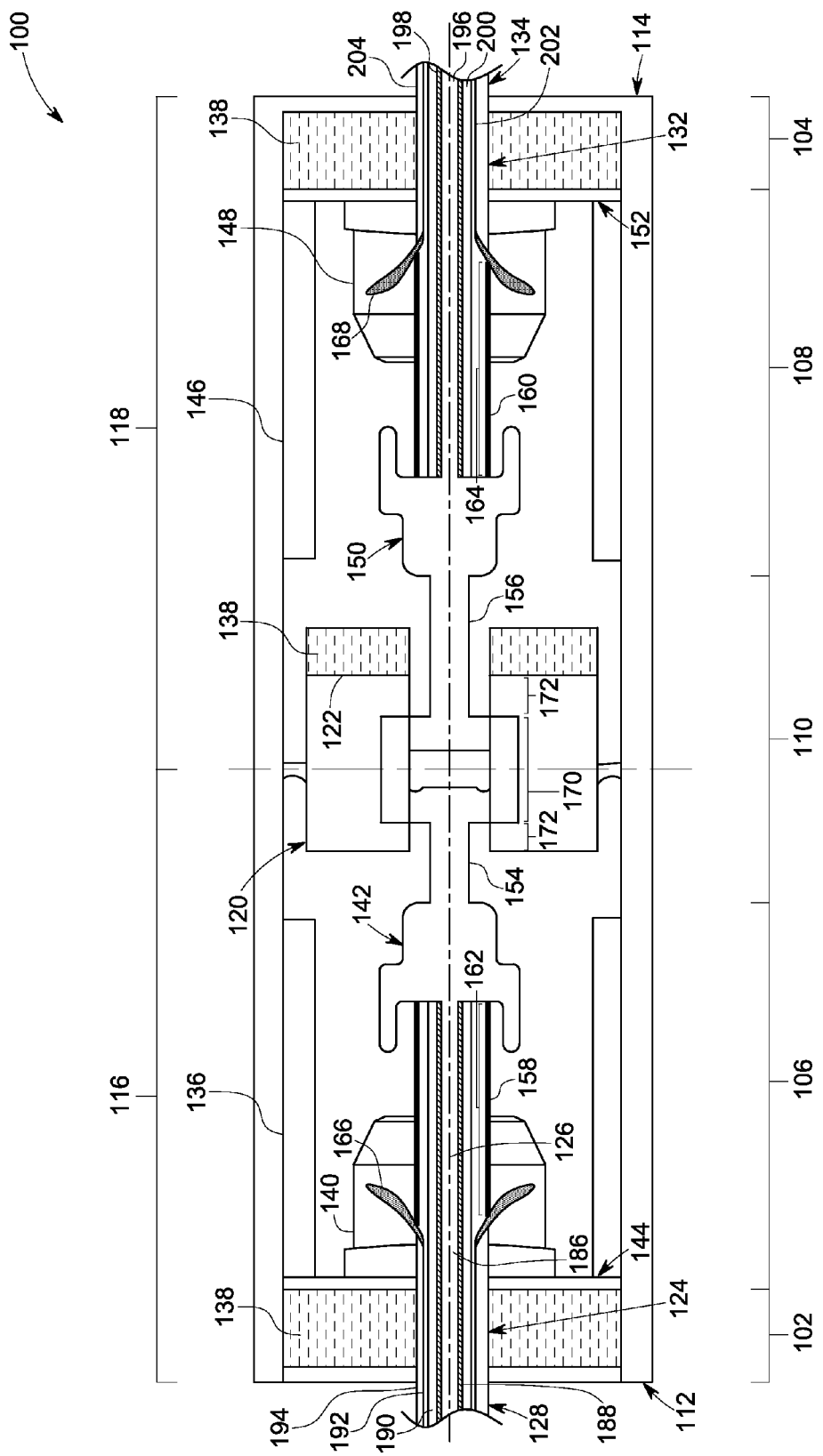
FIG. 1 is a sectional side view of an electrical connector, in accordance with aspects of the present disclosure.

Turning now to the drawings and referring to FIG. 1, a sectional side view of an electrical connector 100, in accordance with aspects of the present disclosure, is depicted. The electrical connector 100 may be used for underwater applications to couple electrical components to one or more power sources. Particularly, in an oil and gas well application, the electrical connector 100 may be used as a coupling device for interconnecting power cables. Also, in one embodiment, the electrical connector 100 may be used for coupling the power cables to one or more electrical components that are disposed on sea floor. The electrical components may include submerged process control equipment, pumping equipment, compression equipment, and motors that are used to govern the extraction and injection of gas and liquids from the oil and gas well.

In addition, the electrical connector 100 may be configured to withstand the ambient water pressure. The electrical connector 100 may also be configured to prevent sea water from penetrating into the power cables and/or the electrical components. Particularly, the mechanical structure of the electrical connector 100 may be configured to limit water ingress. In one example, metal seals or gaskets may be used in the electrical connector 100 to isolate vital electrical components from the sea water. Also, the electrical connector 100 may include metallic walls that are configured to withstand the pressure of the sea water. It may be noted that the electrical connector 100 may not be limited to the oil and gas well application, and may be used in other underwater applications, such as submarines and remotely operated vehicles (ROV).

In a presently contemplated configuration, the electrical connector 100 may include a first pressure control chamber 102, a second pressure control chamber 104, a first cable termination chamber 106, a second cable termination chamber 108, and a wet-mate chamber 110. The first and second pressure control chambers 102, 104 may be representative of outer most chambers of the electrical connector 100. In one embodiment, the first pressure control chamber 102 may be positioned at a first end 112 of the electrical connector 100, while the second pressure control chamber 104 may be positioned at a second end 114 of the electrical connector 100.

Moreover, these pressure control chambers 102, 104 may act as barriers between the sea water and the cable termination chambers 106, 108. Also, the pressure control chambers 102, 104 may be coupled to one or more pressure compensating devices (not shown) to withstand the varying pressure of the sub-sea water.

Furthermore, the first cable termination chamber 106 may be disposed adjacent to the first pressure control chamber 102, while the second cable termination chamber 108 may be disposed adjacent to the second pressure control chamber 104. Also, the first and second cable termination chambers 106, 108 may be coupled by the wet-mate chamber 110. In one embodiment, the wet-mate chamber 110 may be centrally located in the electrical connector 100, as depicted in FIG. 1. Moreover, in one embodiment, prior to connecting the power cables, the electrical connector 100 may include two separate halves 116, 118 that are joined or coupled together to form the electrical connector 100. The first half 116 of the electrical connector 100 may include the first pressure control chamber 102, the first cable termination chamber 106, and about one half of the wet-mate chamber 110. Similarly, the second half 118 of the electrical connector 100 may include the second pressure control chamber 104, the second cable termination chamber 108, and the other half of the wet-mate chamber 110. After connecting the power cables to two halves of the electrical connector 100, the two halves of the wet-mate chamber 110 may be joined together to form a complete enclosed wet-mate chamber 110, as depicted in FIG. 1. In addition, the wet-mate chamber 110 may include a piston subunit 120. Furthermore, the piston subunit 120 may include an embedded metal adaptor or retractable pin 122 that may be movable to establish electrical connection between the two halves 116, 118 of the electrical connector 100.

In addition, these chambers 102, 104, 106, 108, 110 may be filled with a dielectric fluid 138. Also, these chambers 102, 104, 106, 108, 110 may include one or more bellows (not shown) that aid in adjusting the pressure of the dielectric fluid 138 based on the pressure of the sea water. The dielectric fluid 138 may include any fluid that acts as an electrical insulator and does not support the flow of electric current. In one example, the dielectric fluid 138 may include oil.

As depicted in FIG. 1, the first pressure control chamber 102 may include an inner cylindrical cavity 124 that extends axially through the first pressure control chamber 102 along a centerline axis 126. The inner cylindrical cavity 124 may be configured to receive a first power cable 128 that is used for DC power transmission. In one embodiment, the first power cable 128 may be used to transmit high voltage direct current (HVDC) power. Also, in one example, the HVDC power may be in a range from about 1 MW to about 10 MW.

In one embodiment, the first power cable 128 may include a plurality of concentric layers that are disposed on one another. More specifically, moving from the center towards the outer surface of the first power cable 128, the first power cable 128 may include a conductor 186, a conductive screen layer 188, an insulating layer 190, an insulation screen layer 192, and an outer layer 194. In one example, the conductive screen layer 188 may include a semi-conductive polymer and the insulating layer 190 may include cross-linked polyethylene (XLPE). Also, the insulation screen layer 192 may include semi-conductive XLPE and the outer layer 194 may include swelling tape and a metal sheath. It may be noted that the power cable 128 may include other layers and is not limited to the number of layers shown in FIG. 1.

Furthermore, the first power cable 128 may be disposed in the inner cylindrical cavity 124 of the first pressure control chamber 102. Also, the first power cable 128 may be terminated in the first cable termination chamber 106, as depicted in FIG. 1. It may be noted that the first power cable 128 may be representative of one of the power cables that are deployed underwater to supply power from a power source to the electrical components that are disposed on the sea floor.

In a similar manner, the second pressure control chamber 104 may include an inner cylindrical cavity 132 that extends axially through the second pressure control chamber 104 along the centerline axis 126. The inner cylindrical cavity 132 may be used to receive a second power cable 134. In one embodiment, the second power cable 134 may be representative of one of the power cables that may be coupled to the electrical components on the sea floor. In another embodiment, the second power cable 134 may be representative of one of the multiple power cables that are interconnected to form a long cable in the sub-sea water. Further, the second power cable 134 may be disposed in the inner cylindrical cavity 132 of the second pressure control chamber 104. Moreover, the second power cable 134 may be terminated in the second cable termination chamber 108, as depicted in FIG. 1.

The second power cable 134 may also include a plurality of concentric layers that are disposed on one another. More specifically, moving from the center towards the outer surface of the second power cable 134, the second power cable 134 may include a conductor 196, a conductive screen layer 198, an insulating layer 200, an insulation screen layer 202, and an outer layer 204. In one example, the conductive screen layer 198 may include semi-conductive polymer and the insulating layer 200 may include cross-linked polyethylene (XLPE). Also, the insulation screen layer 202 may include semi-conductive XLPE and the outer layer 204 may include swelling tape and metal sheath.

Furthermore, the first cable termination chamber 106 may include a steel chamber 136 that is filled with the dielectric fluid 138. Further, the steel chamber 136 may be sealed to prevent sea water ingression under high sea water pressure. In addition, the steel chamber 136 may include a first stress cone 140 and a first Faraday cage 142. Particularly, the first stress cone 140 that may be disposed at one end 144 of the first cable termination chamber 106. The first stress cone 140 may include an aperture that is aligned with the inner cylindrical cavity 124 of the first pressure control chamber 102 to receive the first power cable 128 from the first pressure control chamber 102. Also, the first stress cone 140 may be configured to terminate the insulation screen layer 192 of the first power cable 128. In one example, the first stress cone 140 may include an insulation rubber unit (not shown in FIG. 1) that blocks/terminates the insulation screen layer 192 of the first power cable 128. Further, the other layers, such as the conductor 186, the conductive screen layer 188, and the insulating layer 190 may extend further beyond the first stress cone 140. Particularly, the conductor 186 and the conductive screen layer 188 may be extended further and coupled to the first Faraday cage 142, while the end of the insulating layer 190 may be disposed within the first Faraday cage 142. As depicted in FIG. 1, the first Faraday cage 142 may be a metal unit that is coupled to the piston subunit 120 of the wet-mate chamber 110. The first stress cone 140 and the first Faraday cage 142 will be explained in greater detail with reference to FIG. 2.

In a similar manner, the second cable termination chamber 108 may include a steel chamber 146 that is filled with the dielectric fluid 138. Further, the steel chamber 146 may be sealed to prevent sea water ingression under high sea water pressure. In addition, the steel chamber 146 may include a second stress cone 148 and a second Faraday cage 150. Particularly, the second stress cone 148 may be disposed at one end 152 of the second cable termination chamber 108. The second stress cone 148 may include an aperture that is aligned with the inner cylindrical cavity 132 of the second pressure control chamber 104 to receive the second power cable 134 from the second pressure control chamber 104. Also, the second stress cone 148 is configured to terminate the insulation screen layer 192 of the second power cable 134. In one example, the second stress cone 148 may include an insulating rubber unit (not shown in FIG. 1) that blocks/terminates the insulation screen layer 202 of the second power cable 134. Further, the other layers of the second power cable 134, such as the conductor 196, the conductive screen layer 198, and the insulating layer 200 may be extended further beyond the second stress cone 148. Particularly, the conductor 196 and the conductive screen layer 198 may be extended further and coupled to the second Faraday cage 150, while the end of the insulation layer 200 may be disposed within the second Faraday cage 150. As depicted in FIG. 1, the second Faraday cage 150 may be a metal unit that is coupled to the piston subunit 120 in the wet-mate chamber 110. The structure of the second stress cone 148 and the second Faraday cage 150 will be explained in greater detail with reference to FIG. 2.

Moreover, the wet-mate chamber 110 may include a first conducting pin 154, a second conducting pin 156 in addition to the piston subunit 120. The first conducting pin 154 may be coupled to the first Faraday cage 142, while the second conducting pin 156 may be coupled to the second Faraday cage 150. Further, the piston subunit 120 may be configured to electrically couple or decouple the first conducting pin 154 from the second conducting pin 156.

In a presently contemplated configuration, the piston subunit 120 may include the retractable pin 122 that may be moved to an ON or OFF position. When the retractable pin 122 is moved to the ON position, the first conducting pin 154 may be electrically coupled to the second conducting pin 156, as depicted in FIG. 1. However, if the retractable pin 122 is moved to the OFF position, the first conducting pin 154 may be electrically decoupled from the second conducting pin 156. Also, the piston subunit 120 may be positioned in the dielectric fluid 138, such as oil to provide insulation to the first and second conducting pins 154, 156 when the retractable pin 122 is in the OFF position. In addition, the dielectric fluid 138 may be used to prevent sea water ingression into the piston subunit 120.

Typically, conventional electrical connectors are employed to connect power cables that are used for AC power transmission. However, as oil exploration and drilling activities extend to greater water depths and longer step outs, power transmission over long distances becomes increasingly challenging for AC power cables because of the capacitive load of the cables. Thus, DC power transmission is a highly promising solution for sub-sea electrical components. If AC connectors are used for DC power transmission, special field distribution properties associated with DC may lead to failure of the AC connectors. More specifically, while the DC electric field distribution may be determined by the resistivity of the materials, the AC field distribution may be determined by the dielectric constant corresponding to the material. Also, the resistivity may vary by several orders of magnitude across different insulators in the electrical connector. In one example, the resistivity in oil may be less than $10^{12}$ ohm-m and the resistivity in cable insulation may be greater than $10^{15}$ ohm-m. Moreover, the resistivity may vary with change in temperature. On the other hand, the dielectric constant may have minimal variation with change in temperature. In one example, the dielectric constant may typically vary between 2 and 4. Thus, the uniformity and/or predictability of the DC field distribution may be lower than the uniformity and/or predictability of the AC field. In addition, under transient events the field distribution may contain both resistively graded components and capacitively graded components. Also, space charge accumulation may occur under DC voltages, which in turn leads to further field distortions. These factors may result in severe enhancement of not only the DC fields but also the AC fields that may exist when the voltage is varied. This enhancement of the DC and AC fields may in turn create internal stress on the components employed in the AC connectors. This stress in turn may damage the components and/or the power cables that are coupled to the AC connectors.

To overcome the above shortcomings, in one exemplary embodiment, the electrical connector 100 may be used for electrically coupling DC power cables 128, 134. In one embodiment, the first cable termination chamber 106 may include a first non-linear resistive layer 158 that is disposed along an unsheathed portion 162 of the first power cable 128 in the first cable termination chamber 106. The unsheathed portion 162 may be defined as a portion of the power cable that includes only the conductor, the conductive screen layer, and the insulation layer. More specifically, the first non-linear resistive layer 158 may include a first end that is coupled to one end of the insulation screen layer 192 of the first power cable 128 and a second end that is coupled to the first Faraday cage 142.

In a similar manner, the second cable termination chamber 108 of the electrical connector 100 may include a second non-linear resistive layer 160 that is disposed along an unsheathed portion 164 of the second power cable 134. Here again, the second non-linear resistive layer 164 may include a first end that is coupled to one end of the insulation screen layer 200 of the second power cable 134 and a second end that is coupled to the second Faraday cage 150. These non-linear resistive layers 158, 160 may be configured to control the DC electric field that may be generated in the first and second cable termination chambers 106, 108. More specifically, by disposing the non-linear resistive layers 158, 160 along the unsheathed portions 162, 164 of the first and second power cables 128, 134, the DC electric field may be uniformly distributed across the electrical connector 100. This uniform distribution of the DC electric field may in turn prevent the concentration of the DC electric field in the connector 100, particularly in the cable termination chambers 106, 108, thereby minimizing stress due to the concentrated DC electric field on the components and/or the cables 128, 134 in the electrical connector 100.

Furthermore, during transient events, the DC voltage in the power cables 128, 134 may change rapidly and may induce an AC electric field across the connector 100. This AC electric field may also create stress on the components of the connector 100. To control this AC electric field along with the DC electric field, the non-linear resistive layers 158, 160 may include non-linear semi-conductive fillers and/or dielectric fillers. In one example, the semi-conductive fillers may include carbon black, silicon carbide, and zinc oxide. Also, the dielectric fillers may include ferroelectric fillers such as barium titanate and anti-ferroelectric fillers such as lead zirconate titanate stannate. These non-linear semi-conductive fillers may aid in reducing the resistivity of the layers 158, 160, when the non-linear resistive layers 158, 160 are subjected to high electric fields. This reduction in the resistivity of the non-linear resistive layers 158, 160 in turn aids in reducing or uniformly distributing the DC electric field across the connector 100. Similarly, the dielectric fillers aid in increasing the dielectric constant of the layers 158, 160 when subjected to high fields. This increase in the dielectric constant of the non-linear resistive layers 158, 160 in turn reduces the accumulation of the AC electric field in the connector 100.

Moreover, the first non-linear resistive layer 158 and the second non-linear resistive layer 160 may be selected such that the resistivity of each of these layers 158, 160 is respectively less than the resistivity of the insulation layer 190 of the first power cable 128 and the insulation layer 200 of the second power cable 134. The low resistivity of the non-linear resistive layers 158, 160 aids in uniformly distributing the generated DC electric field across the connector 100. More specifically, the low resistivity of the non-linear resistive layers 158, 160 may aid in reducing harmful charges that may build up in the cable termination chambers 106, 108 due to the DC electric field. Additionally, stresses experienced by the connector 100 due to rapid changes in the DC voltage in the power cables 128, 134 may also be substantially reduced. In one example, the DC voltage may be in range from about 36 kV to about 500 kV. Thus, the concentration of the DC electric field and the stress that may occur due to this concentrated DC electric field may be controlled by placing the one or more non-linear resistive layers 158, 160 along the unsheathed portions 162, 164 of the power cables 128, 134 in the first and second cable termination chambers 106, 108. The structure and composition of the non-linear resistive layers 158, 160 will be explained in greater detail with reference to FIG. 2.

In addition, the DC voltage in the power cables 128, 134 may change rapidly and may induce an AC electric field across the connector 100. This AC electric field may be concentrated across the connector 100 and may damage the components in the connector 100. The exemplary electrical connector 100 may be configured to control this AC electric field that is generated in the first and second cable termination chambers 106, 108. Particularly, the electrical connector 100 may include one or more deflectors 166, 168 that may be configured to aid in minimizing the AC electric field in the connector 100. In one embodiment, due to faults in the power cables, switching impulses and transients may occur in the power cables. These switching impulses and transients may cause or increase electrical fields in the electrical connector 100. In the exemplary electrical connector 100, the one or more deflectors 166, 168 may be configured to minimize these electric fields in the electrical connector 100. Moreover, the deflectors 166, 168 may be designed to have a determined geometric shape that aids in capacitive grading of the AC electric field generated in the cable termination chambers 106, 108. One such geometric shape of the deflectors 166, 168 is depicted in FIG. 1. The aspect of reducing the AC electric field using the deflectors 166, 168 will be explained in greater detail with reference to FIG. 2.

Figure 2:
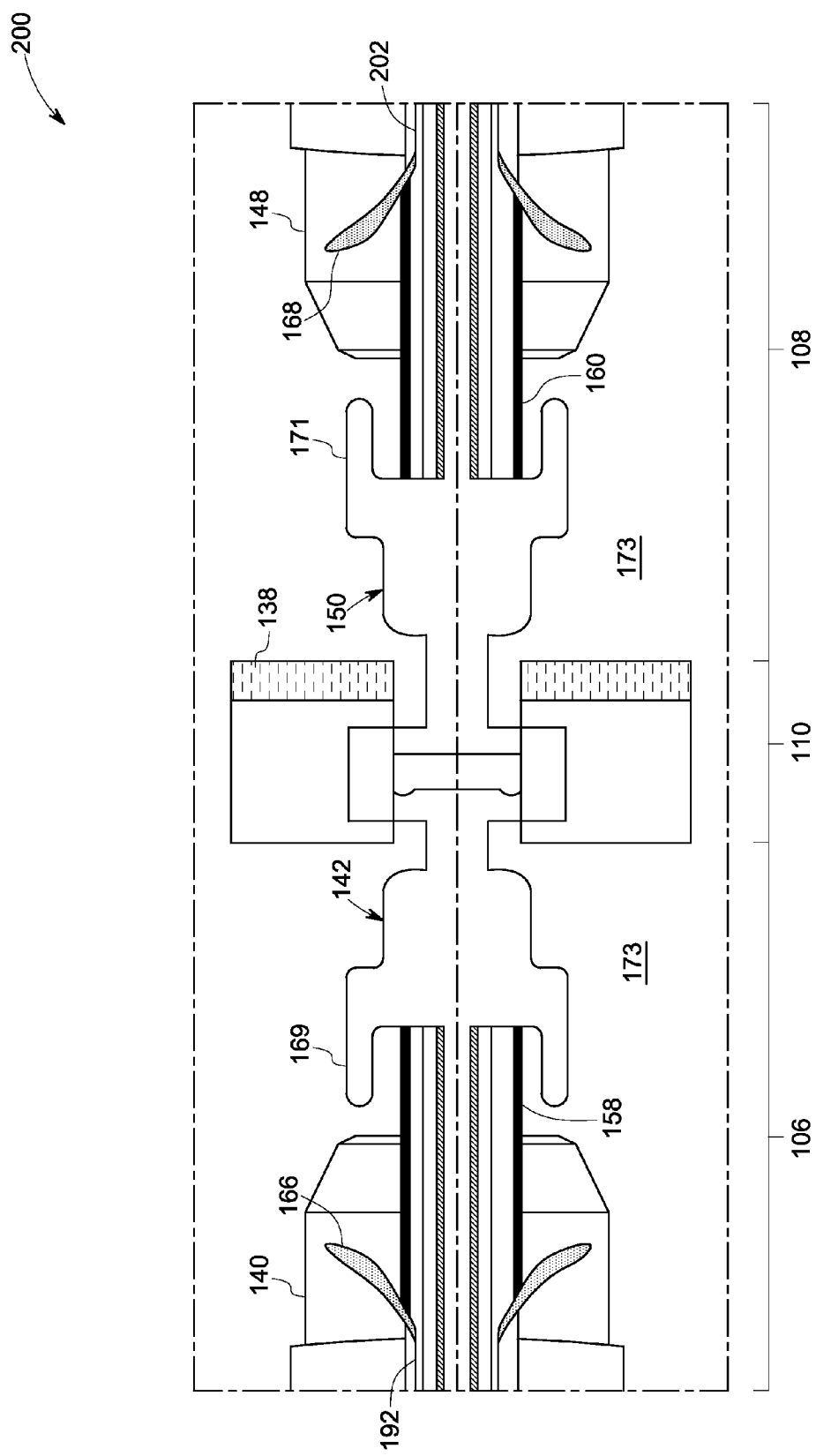
FIG. 2 is a diagrammatical representation of a portion of the electrical connector of FIG. 1, in accordance with aspects of the present disclosure.

FIG. 2 is a diagrammatical representation 200 of a portion of the electrical connector 100 of FIG. 1. The electrical connector 200 may include the first deflector 166 and the second deflector 168. The first deflector 166 may be disposed within the first stress cone 140 and may be coupled to the end of the insulation screen layer 192 in the first cable termination chamber 106. The electrical connector 100 may also include the second deflector 168 that is disposed within the second stress cone 148 and may be coupled to the end of the insulation screen layer 202 in the second cable termination chamber 108. These first and second deflectors 166, 168 may be used for a capacitive grading of an AC electric field. The capacitive grading of the AC electric field in turn minimizes or reduces the concentration of the AC electric field in the electrical connector 200. Particularly, the first and second deflectors 166, 168 may be designed to have a predefined geometric shape that aids in reducing the AC electric field in the electrical connector 200. Since the electric field is perpendicular to the conductors 186, 196, the direction and distribution of the AC electric field may be optimized by controlling the geometric shape of the first and second field deflectors 166, 168. The aspect of embedding or disposing the deflectors 166, 168 within a respective stress cone will be explained in greater detail with respect to FIGS. 4 and 5.

Furthermore, the AC electric field may be reduced by using Faraday cages 142, 150 in the cable termination chambers 106, 108, where the Faraday cases 142, 150 may have a predefined shape. Particularly, as depicted in FIG. 2, the first and second Faraday cages 142, 150 may include a corresponding extended conductive arm 169, 171 that aids in minimizing or reducing the concentration of the AC electric field in the electrical connector 100. More specifically, the extended conductive arms 169, 171 may be used to optimize the direction and distribution of the electric field that is generated between the arms 169, 171 and the conductors 186, 196. By optimizing the direction and distribution of the AC electric field, the concentration of the AC electric field in the electrical connector 200 may be substantially reduced. The structure and dimensions of extended conductive arms in the first and second Faraday cages 142, 150 will be explained in greater detail with reference to FIG. 7.

In addition, the first and second Faraday cages 142, 150 may be insulated by epoxy 173 that is disposed in the steel chambers 136, 146 of the connector 100. In one embodiment, the epoxy 173 may include one or more fillers, such as calcium carbonate, quartz, fumed silica, talc, kaolinite, and montmorillonite. Further, the filler concentration in the epoxy 173 may be in a range from about 0% to about 80% by weight. Moreover, the structure of the epoxy 173 may have different forms. In one embodiment, the region beneath the conductive arms 169, 171 of the Faraday cages 142, 150 may be completely filled with the epoxy 173. Also, the region between the stress cones 140, 148 and the Faraday cages 142, 150 may be filled with the epoxy 173. In another embodiment, the stress cones 140, 148 may extend to an end of a corresponding extended conductive arm 169, 171 of the Faraday cages 142, 150. Further, a portion between the stress cones 140, 148 and a corresponding extended conductive arm 169, 171 may be filled with the epoxy 173. Also, the region beneath the extended conductive arms 169, 171 may be filled with the epoxy 173.

In a presently contemplated configuration, the first and second non-linear resistive layers 158, 160 may be disposed along the surface of a respective insulation layer 190, 200 of the power cables 128, 134. Particularly, the first non-linear resistive layer 158 may extend along the insulation layer 190 from the first deflector 166 in the first stress cone 140 to the first Faraday cage 142 in the first cable termination chamber 106. Also, the first non-linear resistive layer 158 may be in electrical contact with the first deflector 166 and the first Faraday cage 142. In a similar manner, the second non-linear resistive layer 160 may extend along the insulation layer 200 from the second deflector 168 in the second stress cone 148 to the second Faraday cage 150 in the second cable termination chamber 108. Moreover, the non-linear resistive layer 160 may be in electrical contact with the second deflector 168 and the second Faraday cage 150.

In addition, the non-linear resistive layers 158, 160 may be made of a special stress grading material (SGM). The SGM may include a host material and one or more fillers. The host material may be a cross-linked silicone rubber and/or an un-cross-linked silicone compound having low molecular weight. Further, the one or more filler materials may include particles, fibers, and/or platelets that may be made of carbon, zinc oxide, silicon carbide, barium titanate, and lead zirconate titanate. In one embodiment, these non-linear resistive layers 158, 160 may have a thickness that is in a range from about 0.01 mm to about 20 mm. Also, the non-linear resistive layers 158, 160 may be in one or more physical forms. In some non-limiting examples, the physical forms may include a pre-molded tube, curable paint applied on the surface of the cable 128, 134, un-curable grease or compounds applied on the surface of the cable 128, 134 tapes wrapped around the cable 128, 134 and these tapes may be consolidated using pressure and/or temperature, and surface layers molded into the silicone stress cone and/or epoxy insulation.

Figure 3:
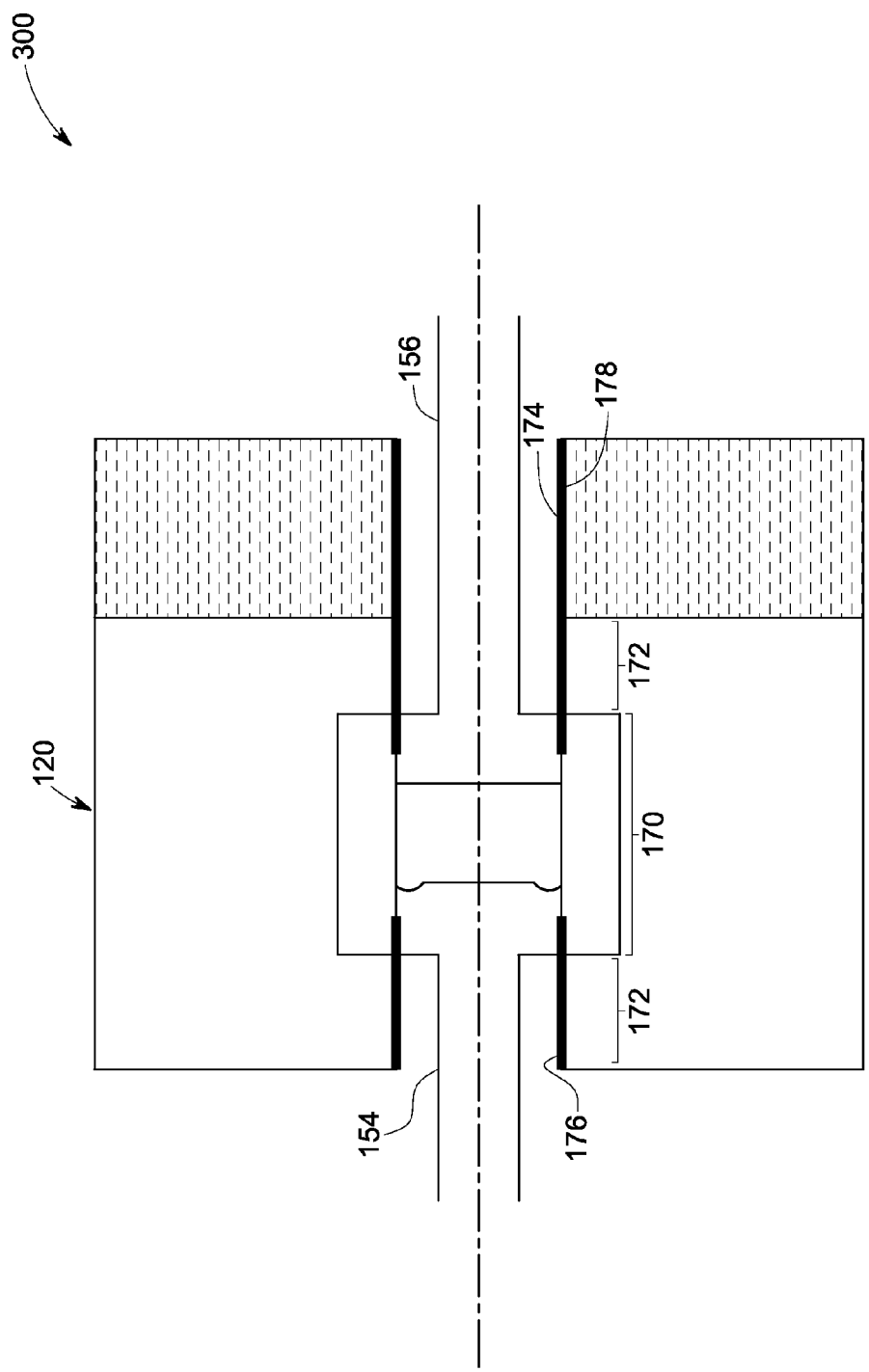
FIG. 3 is a block diagram representation of a portion of the electrical connector of FIG. 1, in accordance with aspects of the present disclosure.

Turning now to FIG. 3, a block diagram representation 300 of a portion of the electrical connector 100 of FIG. 1 is depicted. In particular, FIG. 3 depicts the piston subunit 120 of FIG. 1. As illustrated in FIG. 3, the piston subunit 120 may include a conducting portion 170 and a non-conducting portion 172. The non-conducting portion 172 may include epoxy material that is doped with a conductive material to reduce the DC electric field along the piston subunit 120.

Also, in another embodiment, the electrical connector 300 may include one or more segments of a stress grading layer 174 that are disposed in the wet-mate chamber 110. The stress grading layer 174 may aid in reducing the DC electric field in the wet-mate chamber 110. These segments of the stress grading layer 174 may be disposed on a surface of the piston subunit 120 that interfaces with the conducting pins 154, 156. Particularly, as depicted in FIG. 3, a first segment 176 of the stress grading layer 174 may be disposed along the surface of the non-conducting portion 172 that is facing the first conducting pin 154 of the piston subunit 120. Similarly, the second segment 178 of the stress grading layer 174 may be disposed along the surface of the non-conducting portion 172 that is facing the second conducting pin 156. These segments 176, 178 of the stress grading layer 174 may aid in uniformly distributing the DC electric field around the piston subunit 120, and thereby reducing the concentration of the DC electric field in the connector 300.

In one embodiment, the stress grading layer 174 may include a host material and one or more filler materials. The host material may include an epoxy material and/or a cross-linked silicone rubber. Further, the one or more filler materials may include particles, fibers, and/or platelets that may be made of carbon, zinc oxide, silicon carbide, barium titanate, and lead zirconate titanate. Also, the stress grading layer 174 in the wet-mate chamber 110 may be in one or more physical forms. Some non-limiting examples of the physical forms include a pre-molded tube, curable paint applied on the surface of the epoxy insulation, tapes wrapped around the epoxy insulation and these tapes may be consolidated using pressure and/or temperature, surface layers molded into the epoxy insulation. Moreover, the stress grading layer 174 may have a conductivity that is higher than the conductivity of the non-linear resistive layers 158, 160.

Thus, by employing one or more non-linear resistive layers 158, 160, one or more stress grading layers 174, one or more deflectors 166, 168, and one or more Faraday cages 142, 150 with extended conductive arms 169, 171 in the electrical connector 100, the DC electric field and the AC electric field may be controlled or substantially reduced in the electrical connector 100.

Figure 4:
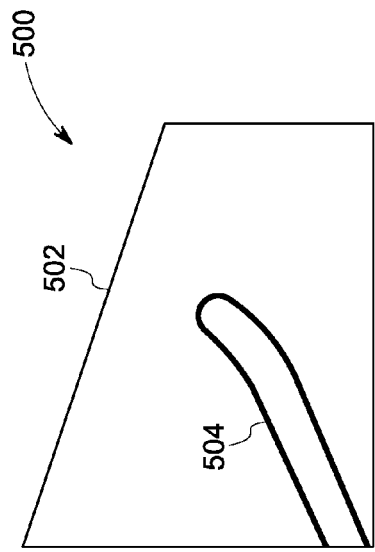
FIG. 4 is a diagrammatical representation of one embodiment of a deflector embedded in a stress cone, in accordance with aspects of the present disclosure.

Referring now to FIG. 4, a diagrammatical representation 400 of a deflector 404 embedded in a stress cone 402, in accordance with one embodiment of the present disclosure, is depicted. The stress cone 402 and the deflector 404 may be representative of the first stress cone 140 having the first deflector 166 or the second stress cone 148 having the second deflector 168 of FIG. 1. The stress cone 402 may be made of insulation rubber. In one example, the insulation rubber may include unfilled silicone rubber or silicone rubber reinforced with inorganic fillers. Further, the deflector 404 may be embedded inside the stress cone 402. In one embodiment, as depicted in FIG. 4, the field deflector 404 may be in the form of a solid piece of conductive rubber that is embedded inside the insulating rubber of the stress cone 402. The conductive rubber may be formed by filling the insulating rubber with conductive fillers. The insulating rubber may include silicone and the conductive fillers may include carbon and metal. In one example, the carbon may include carbon black, carbon fibers, carbon nanotubes, and/or graphene. In another example, the metal may include silver, nickel, and/or copper, in the form of particles or fibers. Further, the size of the conductive fillers in the conductive rubber may be in a range from about 1 nm to about 100 m. Also, the conductivity of the conductive rubber may be in a range from about 0.001 S/m to about 10000 S/m.

Figure 5:
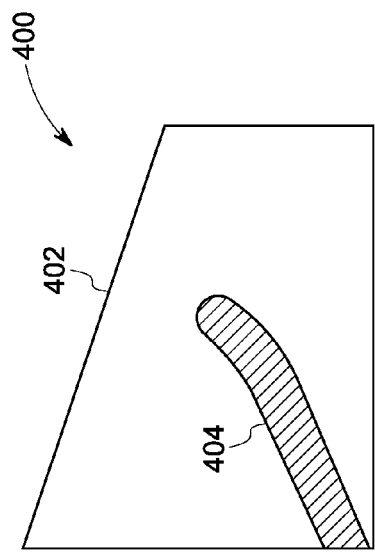
FIG. 5 is a diagrammatical representation of another embodiment of a deflector embedded in a stress cone, in accordance with aspects of the present disclosure.

Turning now to FIG. 5, a diagrammatical representation 500 of a deflector 504 embedded in a stress cone 502, in accordance with another embodiment of the present disclosure, is depicted. The stress cone 502 and the deflector 504 may be similar to the stress cone 402 and the deflector 404 of FIG. 4, except that the deflector 404 of FIG. 4 is in the form of a solid piece of conductive rubber, while the deflector 504 is in the form of a conductive surface that is embedded in the insulating rubber of the stress cone 502.

Figure 6:
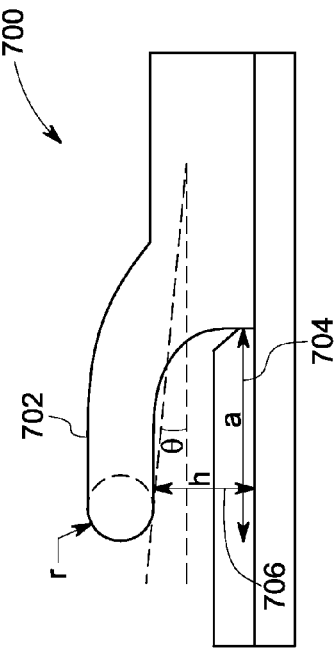
FIG. 6 is a diagrammatical representation of a deflector, in accordance with aspects of the present disclosure.

FIG. 6 is a diagrammatical representation 600 of a deflector, in accordance with aspects of the present disclosure. Reference numeral 600 may be representative of the deflector 166 or the deflector 168 of FIG. 1. For ease of understanding, the deflector 600 is described with reference to the components of FIG. 1. The deflector 600 may be used to reduce the AC electric field in the electrical connector 100. The deflector 600 may include a linear portion 602 and a curved portion 604. The linear portions 602 of respective deflectors 166, 168 may be electrically coupled to ends of the corresponding insulation screen layers 192, 202 of the power cables 128, 134. Moreover, the linear portion 602 may have a width in a range from about 0.01 m to 0.5 m. Also, the linear portion may form an angle θ with the surface of the power cable 128, 134. The angle θ may be in a range from about 0 degree to 90 degrees. Further, the curved portion 604 may be adjacently disposed to the linear portion 602 of the deflector 600. It may be noted that the linear portion 602 and the curved portion 604 of the deflector 600 may be a continuous structure, as depicted in FIG. 6. The curved portion 604 may have a radius of curvature 'R' that may be in a range from about 0.005 m to about 0.2 m. Also, the curved portion 604 may have a width that is in a range from about 0.001 m to about 0.2 m. In addition, the end of the curved portion 604 may have a circular shape that has a radius 'r' that may be in a range from about 0.001 m to about 0.05 m. These straight and the curved portions 602, 604 of the deflector 600 may aid in optimizing the direction and distribution of the AC electric field that is parallel to the power cable. This in turn reduces the concentration of the AC electric field in the electrical connector 100.

Figure 7:
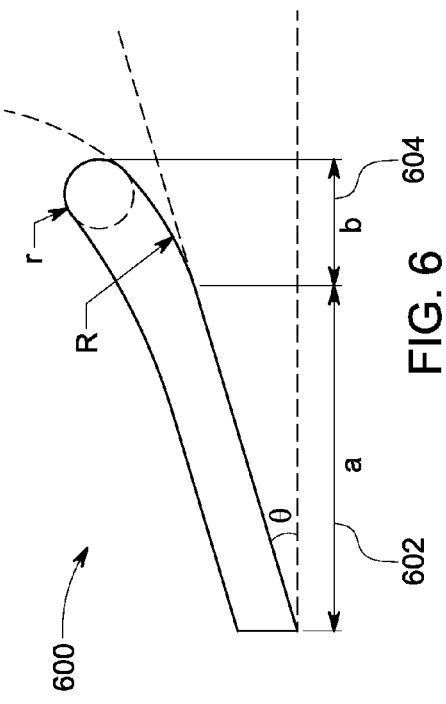
FIG. 7 is a diagrammatical representation of a portion of a Faraday cage including an extended conductive arm, in accordance with aspects of the present disclosure.

Referring now to FIG. 7, a diagrammatical representation 700 of a portion of a Faraday cage including an extended conductive arm of FIG. 1, in accordance with aspects of the present disclosure, is depicted. Reference numeral 700 may be representative of the first Faraday cage 142 or the second Faraday cage 150 of FIG. 1. The Faraday cage 700 is used to couple a respective power cable 128, 134 to the piston subunit 120. Also, the Faraday cage 700 includes the extended conductive arm 702 that aids in optimizing the direction and distribution of an AC electric field in the cable termination chambers 106, 108, which in turn reduces the concentration of the AC electric field in the connector 100.

The Faraday cage 700 may be formed by a metal with an extended conductive arm 702. The metal may be copper or aluminum. Also, the extended conductive arm 702 may have a width 'a' 704 that may be in a range from about 0.01 m to about 0.5 m. Also, the extended conductive arm 702 may be at an angle θ from the surface of the power cable that is coupled to the Faraday cage 700. In one example, the angle θ may be in a range from about 45 degrees to about 60 degrees. Furthermore, the extended conductive arm 702 may have a height 'h' 706 from the surface of the power cable. Also, a ratio between the height 706 and the width 704 of the extended conductive arm 702 may be in a range from about 0.01 to about 2. In addition, the tip of the extended conductive arm may have a circular shape with radius 'r' that is in a range from about 0.001 m to about 0.05 m.

Figure 8:
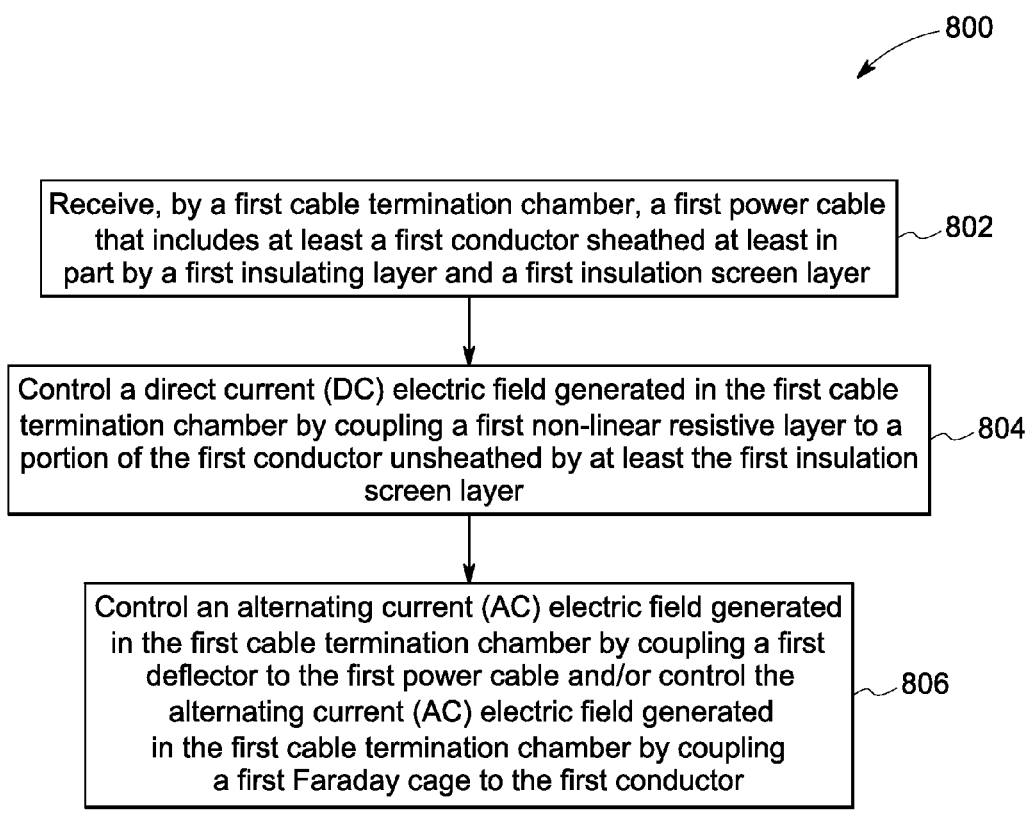
FIG. 8 is a flow chart illustrating a method for controlling an electric field in the electrical connector of FIG. 1, in accordance with aspects of the present disclosure.

Referring to FIG. 8, a flow chart illustrating a method 800 for controlling an electric field in an electrical connector such as the electrical connector 100 of FIG. 1, in accordance with aspects of the present disclosure, is depicted. For ease of understanding, the method 800 is described with reference to the components of FIGS. 1-7. The method 800 begins at step 802, where the first power cable 128 may be received by the first cable termination chamber 106. The first power cable 128 may be used for transmitting HVDC power to the electrical components on the sea floor. Also, the first power cable 128 may include the first conductor 186 that is sheathed at least in part by at least the first insulating layer 190 and the first insulation screen layer 192.

Subsequently, at step 804, a DC electric field generated in the first cable termination chamber 106 may be controlled. In one embodiment, the DC electric field generated in the first cable termination chamber 106 may be controlled by coupling the first non-linear resistive layer 158 to a portion of the first conductor 186 that is unsheathed by at least the first insulation screen layer 192. The unsheathed portion of the first conductor 186 may be defined as a portion of the first power cable 128 that is unsheathed by the insulation screen layer 192 and the outer layer 194. Particularly, the first non-linear resistive layer 158 may extend along the unsheathed portion of the first conductor 186 from the first deflector 166 in the first stress cone 140 to the first Faraday cage 142. Also, the first non-linear resistive layer 158 may be in electrical contact with the first deflector 166 and the first Faraday cage 142. The first non-linear resistive layer 158 may be designed such that the resistivity of this layer 158 is less than the resistivity of the insulation screen layer 192. The low resistivity of the non-linear resistive layer 158 aids in uniformly distributing the generated DC electric field along the electrical connector 100. This uniform distribution of the DC electric field may in turn prevent the concentration of the DC electric field in the connector 100, particularly in the cable termination chamber 106, thereby minimizing stress due to the concentrated DC electric field on the components and/or the cable 128 in the electrical connector 100.

In addition, as indicated by step 806, an AC electric field generated in the first cable termination chamber 106 may be controlled. In one embodiment, the AC electric field in the first cable termination chamber 106 may be controlled by coupling the first deflector 166 to the first power cable 128. Particularly, the first deflector 166 may be disposed or embedded within the first stress cone 140 and may be coupled to one end of the insulation screen layer 192. Also, the first deflector 166 may be designed to have a determined geometric shape that aids in optimizing the direction and distribution of the AC electric field. Optimizing the direction and distribution of the AC electric field may in turn minimizes or reduces the concentration of the AC electric field in the electrical connector 100. In another embodiment, the AC electric field generated in the first cable termination chamber 106 may be controlled by coupling the first Faraday cage 142 to the first conductor 186. More specifically, the first Faraday cage 142 may include an extended conductive arm 169 that is used to optimize the direction and distribution of the AC electric field generated in the first cable termination chamber 106. By optimizing the direction and distribution of the AC electric field, the concentration of the AC electric field in the electrical connector 100 may be substantially reduced.

Thus, by employing one or more non-linear resistive layers, one or more deflectors, and one or more Faraday cages with extended conductive arms in the electrical connector 100, the DC electric field and the AC electric field may be controlled and/or substantially reduced in the electrical connector 100. This in turn reduces the stress on the components in the electrical connector 100 and prevents damage of the electrical connector 100 and/or the power cables 128, 134.

The various embodiments of the system and method aid in providing HVDC power transmission to electrical components on the sea floor. Since the connectors are designed with one or more non-linear resistive layers and deflectors, cost of manufacturing and/or maintaining these connectors may be substantially reduced.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. An electrical connector, comprising:
 a first cable termination chamber configured to receive a first power cable comprising at least a first conductor sheathed at least in part by a first insulating layer and a first insulation screen layer;

a first non-linear resistive layer configured to be coupled to a portion of the first conductor unsheathed by at least the first insulation screen layer and configured to control a direct current electric field generated in the first cable termination chamber;

a first deflector configured to be coupled to the first power cable and control an alternating current electric field generated in the first cable termination chamber;

a second cable termination chamber configured to receive a second power cable comprising at least a second conductor sheathed at least in part by a second insulating layer and a second insulation screen layer;

a second non-linear resistive layer configured to be coupled to a portion of the second conductor unsheathed by at least the second insulation screen layer and configured to control a direct current electric field generated in the second cable termination chamber;

a second deflector configured to be coupled to the second power cable and control the alternating current electric field generated in the second cable termination chamber; and a wet-mate chamber disposed between the first cable termination chamber and the second cable termination chamber, and configured to electrically couple the first power cable to the second power cable, wherein the wet-mate chamber comprises:

a first conducting pin coupled to a first Faraday cage;
a second conducting pin coupled to a second Faraday cage; and
a piston subunit configured to couple the first conducting pin to the second conducting pin.

2. The electrical connector of claim 1, a wherein the first Faraday cage is configured to be coupled to the first conductor and comprises a first extended conductive arm, and wherein the first extended conductive arm is configured to control the alternating current electric field generated in the first cable termination chamber.

3. The electrical connector of claim 2, further comprising a first stress cone disposed at one end of the first cable termination chamber and configured to terminate the first insulation screen layer of the first power cable.

4. The electrical connector of claim 3, wherein the first deflector is disposed within the first stress cone and configured to be coupled to one end of the first insulation screen layer.

5. The electrical connector of claim 2, wherein the first non-linear resistive layer comprises a first end coupled to one end of the first insulation screen layer and a second end coupled to the first Faraday cage.

6. The electrical connector of claim 1, a wherein the second Faraday cage is configured to be coupled to the second conductor and comprises a second extended conductive arm, and wherein the second extended conductive arm is configured to control the alternating current electric field generated in the second cable termination chamber.

7. The electrical connector of claim 6, further comprising a second stress cone disposed at one end of the second cable termination chamber and configured to terminate the second insulation screen layer of the second power cable.

8. The electrical connector of claim 7, wherein the second deflector is disposed within the second stress cone and configured to be coupled to one end of the second insulation screen layer.

9. The electrical connector of claim 6, wherein the second non-linear resistive layer comprises a first end coupled to one end of the second insulation screen layer and a second end coupled to the second Faraday cage.

10. The electrical connector of claim 1, wherein the wet-mate chamber further comprises a stress grading layer disposed at an interface of the piston subunit and the first conducting pin and configured to control the direct current electric field generated in the wet-mate chamber.

11. The electrical connector of claim 10, wherein the stress grading layer is disposed at an interface of the piston subunit and the second conducting pin and configured to control the direct current electric field generated in the wet-mate chamber.

12. The electrical connector of claim 10, wherein each of the stress grading layer, the first non-linear resistive layer, and the second non-linear resistive layer comprises a host material and one or more filler materials.

13. The electrical connector of claim 12, wherein the host material comprises epoxy and silicone rubber and the one or more fillers comprise carbon, zinc oxide, silicon carbide, barium titanate, lead zirconate titanate, or combinations thereof.

14. A method for controlling an electric field in an electrical connector, comprising:

receiving, by a first cable termination chamber, a first power cable comprising at least a first conductor sheathed at least in part by a first insulating layer and a first insulation screen layer;

controlling a direct current electric field generated in the first cable termination chamber by coupling a first non-linear resistive layer to a portion of the first conductor unsheathed by at least the first insulation screen layer;

controlling an alternating current electric field generated in the first cable termination chamber by coupling a first deflector to the first power cable; and controlling the direct current electric field generated in a wet-mate chamber by disposing a stress grading layer at an interface of a piston subunit and one of a first conducting pin and a second conducting pin.

15. The method of claim 14, further comprising controlling the alternating current electric field generated in the first cable termination chamber by coupling a first Faraday cage to the first conductor.

16. The method of claim 14, further comprising:

receiving, by a second cable termination chamber, a second power cable comprising at least a second conductor sheathed at least in part by a second insulating layer and a second insulation screen layer;

controlling a direct current electric field generated in the second cable termination chamber by coupling a second non-linear resistive layer to a portion of the second conductor unsheathed by at least the second insulation screen layer; and controlling an alternating current electric field generated in the second cable termination chamber by coupling a second deflector to the second power cable.

* * * * *